(12) United States Patent
Hintzer et al.

(10) Patent No.: US 6,613,846 B2
(45) Date of Patent: Sep. 2, 2003

(54) CURABLE FLUOROELASTOMER COMPOSITIONS COMPRISING HYDRO SILOXANES OR HYDRO SILAZANES

(75) Inventors: Klaus Hintzer, Kastl (DE); Robert E. Kolb, Afton, MN (US); Peter J. Scott, Madison, AL (US); Erik D. Hare, St. Paul, MN (US); William D. Coggio, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/997,634

(22) Filed: Nov. 29, 2001

(65) Prior Publication Data

US 2002/0103304 A1 Aug. 1, 2002

Related U.S. Application Data

(60) Provisional application No. 60/250,457, filed on Dec. 1, 2000.

(51) Int. Cl.$^7$ .................. C08L 27/22; C08L 27/12
(52) U.S. Cl. .................. 525/326.2; 525/273; 525/281; 525/342
(58) Field of Search .................. 525/326.2, 273, 525/281, 342

(56) References Cited

U.S. PATENT DOCUMENTS

| | | | |
|---|---|---|---|
| 4,000,356 A | 12/1976 | Weisgerber et al. | 526/206 |
| 4,214,060 A | 7/1980 | Apotheker et al. | 525/387 |
| 4,243,776 A | 1/1981 | Marconi et al. | 525/420 |
| 4,501,869 A | 2/1985 | Tatemoto et al. | 526/249 |
| 4,745,165 A | 5/1988 | Arcella et al. | 526/247 |
| 4,831,085 A | 5/1989 | Okabe et al. | 525/387 |
| 5,268,405 A | 12/1993 | Ojakaar et al. | 524/366 |
| 5,554,689 A | 9/1996 | Langstein et al. | 525/102 |
| 5,656,697 A | 8/1997 | Wlassics et al. | 525/326.3 |
| 5,902,857 A | 5/1999 | Wlassics et al. | 525/248 |

FOREIGN PATENT DOCUMENTS

| | | | |
|---|---|---|---|
| EP | 0 661 304 A1 | 7/1995 | C08F/214/18 |
| EP | 0 769 521 A1 | 4/1997 | C08K/5/14 |
| EP | 0 784 064 A1 | 7/1997 | C08F/214/18 |
| WO | 95/02634 | 1/1995 | C08K/5/00 |

OTHER PUBLICATIONS

*Encyclopedia of Polymer Science and Engineering,* Second Edition, vol. 15, John Wiley & Sons, 1989, *Silicones,* pp. 204–308.

*Primary Examiner*—D. R. Wilson
(74) *Attorney, Agent, or Firm*—James V. Lilly; Brian E. Szymanski

(57) ABSTRACT

The present invention provides a curable fluoroelastomer composition comprising:
(a) a fluoroelastomer comprising a cure site component having a halogen capable of participation in a peroxide cure reaction;
(b) an organic peroxide; and
(c) a siloxane or silazane comprising one or more —SiH groups.

The curable fluoroelastomer compositions generally show improved processing and the resulting cured fluoroelastomers generally have improved mechanical and physical properties.

14 Claims, No Drawings

CURABLE FLUOROELASTOMER COMPOSITIONS COMPRISING HYDRO SILOXANES OR HYDRO SILAZANES

CROSS REFERENCE TO RELATED APPLICATION

This application claims priority to U.S. Provisional Patent Application No. 60/250,457, filed Dec. 1, 2000.

DESCRIPTION

1. Field of the Invention

The present invention relates to peroxide curable fluoroelastomer compositions. In particular the present invention relates to such compositions that include a siloxane or silazane that contains one or more SiH functionalities. The invention further relates to a method of curing such compositions and to shaped articles obtained from curing such compositions.

2. Background of the Invention.

Fluoroelastomers (elastomeric perfluoropolymers) and in particular perfluoroelastomers are polymeric materials which exhibit outstanding high temperature tolerance and chemical resistance. Consequently, such compositions are particularly adapted for use as seals and gaskets in systems in which elevated temperatures and/or corrosive chemicals are encountered. They are useful in industries such as, chemical processing, semiconductor, aerospace, petroleum, automotive etc.

The outstanding properties of fluoropolymers are largely attributable to the stability and inertness of the copolymerized fluorinated monomer units which make up the major portion of the polymer backbone, e.g., tetrafluoroethylene (TFE), vinylidene fluoride (VDF), hexafluoropropylene (HFP), chlorotrifluoroethylene (CTFE) and perfluoro(alkyl vinyl) ethers (PAVE). In order to completely develop elastomeric properties, fluoropolymers are typically crosslinked, i.e. vulcanized. The fluoroelastomers can be ionically cured by addition of suitable curing agents (for instance polyhydroxylic compounds, such as Bisphenol AF or Bisphenol A), and accelerators (for instance ammonium, phosphonium, or aminophosphonium salts), and in the presence of bivalent metals oxides and/or hydroxides (for instance MgO, Ca(OH)$_2$). Peroxide-curable fluoroelastomers have also been developed, which contain iodine and/or bromine atoms along the polymeric chain and/or in terminal position. Such iodine and/or bromine atoms can be introduced by suitable iodinated and/or brominated comonomers, or by using iodinated and/or brominated chain transfer agents during the polymer preparation (see for instance U.S. Pat. Nos. 4,243,770, 4,501,869 and 4,745,165). Curing such polymers in the presence of free radicals, coming for instance from a peroxide, the iodine and/or bromine atoms act as cure-sites owing to the homolytic scission of the carbon-halogen bonds.

Although cured fluoroelastomers with good physical properties can be obtained from these so-called peroxide curable fluoroelastomers, there is a desire to further improve these compositions. U.S. Pat. No. 5,656,697 discloses peroxide curable fluoroelastomer compositions that show improved cure speed and good cross-link density. This is accomplished by adding to the composition certain metal-organic hydrides including for example silylhydride compounds.

U.S. Pat. No. 5,902,857 teaches to add a bisolefin compound to the compositions of U.S. Pat. No. 5,656,697 to improve certain mechanical properties of cured fluoroelastomers obtainable from such compositions. The bisolefin compound is taught to act as a coagent in the curing reaction.

Despite the many different peroxide-curable fluoroelastomer compositions known in the art, it would be desirable to find further compositions having beneficial properties. In particular, it would be desirable to find compositions that allow for easy, cost-effective processing such as, for example, good mold release and reduced mold fouling, as well as compositions that have good curing properties such as speed of cure and cross-link density. Furthermore, the cured elastomers obtainable from such compositions desirably have excellent physical and mechanical properties including high tensile strength, high elongation at break, and low compression set.

SUMMARY OF THE INVENTION

The present invention provides a curable fluoroelastomer composition comprising:

(a) a fluoroelastomer comprising a cure site component having a halogen capable of participation in a peroxide cure reaction;

(b) an organic peroxide; and (c) a siloxane or silazane comprising one or more SiH groups.

In a specific embodiment of the invention, the siloxane or silazane comprises one or more —QSiH groups wherein Q is oxygen (O) or nitrogen (N).

It has been found in connection with the invention that such curable composition can be readily cured at high speed and to a good cross-link density. Moreover, cured fluoroelastomers can be obtained that have good physical and mechanical properties. Further, the compositions generally have improved processing properties, in particular better mold release, less mold fouling, improved skin-cure properties and better flow characteristics.

The invention also provides a method of making shaped articles by curing the curable fluoroelastomer composition and to the shaped fluoroelastomeric articles obtainable from such method.

DETAILED DESCRIPTION OF THE INVENTION

The siloxanes for use in the curable fluoroelastomer composition are compounds that include one or more Si—O bond and at least one SiH group, preferably an —O—SiH group. The siloxanes for use in this invention include low molecular weight compounds as well as polysiloxanes which comprise repeating siloxy groups. The polysiloxanes can be linear, branched or cyclic. Examples of low molecular weight siloxanes include for example alkoxy silanes corresponding to the formula:

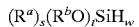

$(R^a)_s(R^bO)_t SiH_w$ wherein each $R^a$ independently represents an alkyl group such as for example methyl or ethyl or another lower alkyl ($C_1$–$C_7$ alkyl group) or an alkyl group substituted with a substituent such as for example an aryl group, an ester, an alkoxy etc., or aryl group optionally substituted such as for example with an alkyl group, an ester, an alkoxy etc., each $R^b$ independently represents an alkyl group, preferably a lower alkyl group and which may optionally be substituted, t and w represent an integer of at least 1 and the sum of s+t+w being 4. Examples of siloxanes according to the above formula include $HSi(OCH_2CH_3)_3$ and $(CH_3)_2(CH_3CH_2O)SiH$.

In accordance with another embodiment in connection with the present invention, the siloxane is a polysiloxane (oligomer or polymer), comprising a polysiloxy backbone. Such polymer or oligomer may be terminated by an SiH group and/or may contain SiH groups distributed along the backbone. The SiH groups may form part of the backbone or they can be present in a side group attached to the backbone.

For example, polysiloxanes for use in the curable fluoroelastomer compositions of the invention include those that correspond to the formula:

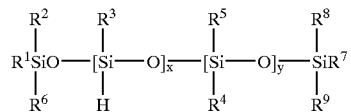

wherein $R^1$, $R^2$, $R^3$, $R^6$, $R^7$, $R^8$ and $R^9$ each independently represents hydrogen, an alkoxy group, an alkyl optionally substituted such as for example with an aryl group, an ester, an alkoxy etc., or aryl group optionally substituted such as for example with an alkyl group, an ester, an alkoxy etc., $R^4$ and $R^5$ each independently represents an alkoxy group, an alkyl or aryl group each of which may optionally be substituted, x represents a value of 0 to 150, y represents a value of 0 to 150 and with the proviso that when x=0, at least one of $R^1$, $R^2$, $R^6$, $R^7$, $R^8$ and $R^9$ represents a hydrogen atom.

Specific examples of siloxanes for use in the curable fluoroelastomer composition include 1,1,3,3 tetraisopropyl disiloxane, diphenyl-1,1,3,3-tetrakis(dimethylsiloxy) disiloxane available from United Chem, silylhydride terminated poly(dimethylsiloxane), poly(methyl hydro siloxane) and copolymers of dimethylsiloxane and methylhydrosiloxane.

Further siloxanes for use in this invention may be cyclic such as those corresponding to the formula:

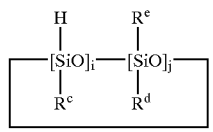

wherein $R^c$ represents hydrogen, an alkyl group or an aryl group, $R^d$ and $R^e$ each independently represents an alkyl or aryl group, i is at least 1 and the sum of i+j is at least 3. Specific examples of cyclic siloxanes according to the above formula are 1,3,5-trimethyl cyclosiloxane and 1-phenyl-3,3,5,5-tetramethyl cyclosiloxane.

Polysiloxanes and siloxanes having OSiH groups are known in the art and can be produced according to well-known procedures such as disclosed in for example: Encyclopedia of Polymer Science and Engineering, Second Edition, V15, Silicones, pgs. 204–308, John Wiley & Sons, 1989. Siloxanes having OSiH groups are also generally commercially available. It will be apparent to one skilled art that the appropriate siloxane or polysiloxane for use in a curable fluoroelastomer composition will dependent on the intended application of the fluoroelastomer and the desired processing conditions thereof. Preferably, the siloxane or polysiloxane will have a molecular weight between 150 g/mol and 10 000 g/mol.

Alternatively to a siloxane or in addition thereto, the curable fluoroelastomer composition may comprise a silazane or a polysilazane. Preferably, the silazane has at least one NSiH group. Suitable silazanes include for example disilazanes corresponding to the formula:

$$H_uSi(R^f)_{3-u}—NR^g—SiH_u(R^h)_{3-u}$$

wherein u is 1 or 2, $R^f$ and $R^h$ each independently represents an alkyl group or an aryl group and $R^g$ represents hydrogen, an alkyl group or an aryl group. A specific example of a silazane is $HSi(CH_3)_2—NH—Si(CH_3)_2H$.

The amount of siloxane and/or silazane in the curable fluorelastomer composition is generally between 0.1 and 10 parts by weight for 100 parts by weight of the fluoroelastomer, preferably between 0.5 and 5 parts by weight for 100 parts by weight of the fluoroelastomer, most preferably between 1 and 4 parts by weight for 100 parts by weight of the fluoroelastomer.

The siloxane and/or silazane compound may be included into the curable fluoroelastomer composition as a precursor which during preparation or further processing of the curable fluoroelastomer composition converts into a siloxane or silazene having one or more QSiH functionalities. For example, a chlorosilane may be used as a precursor. Such chlorosilanes are known to hydrolyse in the presence of water into silanols so that a siloxane having one or more OSiH functions may thereby form.

The fluoroelastomers containing a halogen capable of participating in a peroxide cure reaction that can be used in the curable fluoroelastomer composition include well known fluoroelastomers. Typically, the halogen capable of participating in a peroxide cure reaction is bromine or iodine and the amounts thereof comprised in the fluoroelastomer are generally between 0.001 and 5%, preferably between 0.01 and 2.5%, by weight with respect to the total weight of the fluoroelastomer. The halogen capable of participating in a peroxide cure reaction can be present along the chain and/or in terminal position.

In order to introduce halogens, which are capable of participation in the peroxide cure reaction, along the chain, the copolymerization of the basic monomers of the fluoroelastomer is carried out with a suitable fluorinated curesite monomer (see for instance U.S. Pat. Nos. 4,745,165, 4,831,085, and 4,214,060). Such comonomer can be selected for instance from:

(a) bromo- or iodo- (per)fluoroalkyl-perfluorovinylethers having the formula:

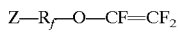

wherein Z is Br or I, $R_f$ is a (per)fluoroalkylene $C_1$–$C_{12}$, optionally containing chlorine and/or ether oxygen atoms; for example: $BrCF_2—O—CF=CF_2$, $BrCF_2CF_2—O—CF=CF_2$, $BrCF_2CF_2CF_2—O—CF=CF_2$, $CF_3CFBrCF_2—O—CF=CF_2$, and the like;

(b) bromo- or iodo (per)fluoroolefins such as those having the formula:

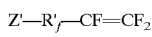

wherein Z' is Br or I, $R'_f$ is a (per)fluoroalkylene $C_1$–$C_{12}$, optionally containing chlorine atoms; for instance: bromotrifluoroethylene, 4-bromo-perfluorobutene-1, and the like; or bromofluoroolefins such as 1-bromo-2,2-difluoroethylene and 4-bromo-3,3,4,4-tetrafluorobutene-1;

(c) non-fluorinated bromo- olefins such as vinyl bromide and 4-bromo-1-butene.

The units derived from the cure site comonomer in the final polymer are present in amounts generally comprised between 0.01 and 5% by moles, preferably between 0.1 and 1% by moles.

In replacement of or in addition to the cure site comonomer, the fluoroelastomer can contain a cure site component in terminal position, deriving from a suitable chain transfer agent introduced in the reaction medium during the polymer preparation, as described in U.S. Pat. No. 4,501,869 or derived from a suitable initiator. Examples of useful initiators include $X(CF_2)_nSO_2Na$ with n=1 to 10 (where X is Br or I).

Examples of chain transfer agents include those having the formula $R_fBr_x$, wherein $R_f$ is a x-valent (per)fluoroalkyl radical $C_1$–$C_{12}$, optionally containing chlorine atoms, while x is 1 or 2. Examples include $CF_2Br_2$, $Br(CF_2)_2Br$, $Br(CF_2)_4Br$, $CF_2ClBr$, $CF_3CFBrCF_2Br$, and the like. Further examples of suitable chain transfer agents are disclosed in U.S. Pat. No. 4,000,356. The amount of cure site component in terminal position is generally comprised between 0.001 and 3%, preferably between 0.01 and 1%, by weight with respect to the fluoroelastomer weight.

The fluoroelastomer contained in the curable fluoroelastomer compositions according to the invention is generally a polymer that is substantially amorphous, i.e. displaying no or hardly any melting point. Typical molecular weight ranges are from $10^4$ to $5 \times 10^5$ g/mol. The optimal molecular weight will dependent on the desired application and can be easily determined by one skilled in the art through routine experimentation. The fluoropolymer comprises a major portion of repeating units that are derived from an ethylenically unsaturated and fluorinated monomer, such as an ethylenically unsaturated monomer having a fluorinated double bond (i.e. one or more of the carbon atoms of the double bond carry one or more fluorine atoms). Fluoroelastomers in connection with the present invention include perfluoroelastomers as well as elastomers that are not fully fluorinated. The fluoroelastomers of the curable fluoroelastomer composition can include any of the fluoroelastomers known to those skilled in the art and include in particular those elastomers that are based on VDF as well as those that are based on TFE. Preferred fluoroelastomers are polymers that have repeating units derived from one or more of the following fluoromonomers: vinylidene fluoride (VDF), hexafluoropropene (HFP), chlorotrifluoroethylene, 2-chloropentafluoropropene, fluorinated vinyl ethers such as perfluoroalkyl vinyl ethers (PAVE), e.g. perfluoro(methyl vinyl ether) (PMVE), fluorinated allyl ethers, tetrafluoroethylene (TFE), 1-hydropentafluoropropene, dichlorodifluoroethylene, trifluoroethylene, and mixtures thereof. The aforementioned fluoromonomers may further be copolymerized with other compounds such as with cure-site monomers (CSM) and/or with non-fluorinated alpha olefin co-monomers such as ethylene (E) and propylene (P). Preferred elastomers are copolymers of vinylidene fluoride and at least one terminally ethylenically-unsaturated fluoromonomer containing at least one fluorine atom substituent on each double-bonded carbon atom, each carbon atom of said fluoromonomer being substituted only with fluorine and optionally with chlorine, hydrogen, a lower fluoroalkyl radical, or a lower fluoroalkoxy radical. Specific examples of copolymers include for example copolymers having a combination of monomers as follows: VDF-HFP, VDF-TFE-HFP, VDF-TFE-PAVE, TFE-PAVE and E-TFE-PAVE. It will be understood by one skilled in the art that these polymers are further modified by cure-site monomers (CSM) and/or halogen containing chain transfer agents or initiators so as to include in the polymers the necessary cure-site component(s) for the peroxide curable fluoroelastomer composition.

Further fluoroelastomers for use in the curable fluoroelastomer composition include those that are based on TFE or VDF and that include one or more perfluorovinyl ethers as a comonomer. Examples of suitable perfluorinated vinyl ethers are those of the formula:

$$CF_2=CFO(R_fO)_n(R'_fO)_mR''_f$$

where $R_f$ and $R'_f$ are different linear or branched perfluoroalkylene groups of 2–6 carbon atoms, m and n are independently 0–10, and $R''_f$ is a perfluoroalkyl group of 1–6 carbon atoms. A preferred class of perfluoro vinyl ethers includes perfluoro alkyl vinyl ethers of the formula:

$$CF_2=CFO(CF_2CFXO)_nR''_f$$

where X is F or $CF_3$, n is 0–5, and $R''_f$ is a perfluoroalkyl group of 1–6 carbon atoms. Most preferred perfluoro(alkyl vinyl) ethers are those wherein n is 0 or 1 and $R''_f$ contains 1–3 carbon atoms. Examples of such perfluorinated ethers include perfluoro(methyl vinyl) ether, perfluoro(ethyl vinyl) ether, and perfluoro(propyl vinyl) ether. Other useful perfluoro vinyl ethers include compounds of the formula $$CF_2=CFO[(CF_2)_mCF_2CFZO]_nR''_f$$

where $R''_f$ is a perfluoroalkyl group having 1–6 carbon atoms, m=0 or 1, n=0–5, and Z=F or $CF_3$. Preferred members of this class are those in which $R''_f$ is $C_3F_7$, m=0, and n=1. Additional perfluoro vinyl ether monomers useful in the invention include compounds of the formula $$CF_2=CFO\ [(CF_2CFCF_3O)_n(CF_2CF_2CF_2O)_m(CF_2)_p]C_xF_{2x+1}$$

where m and n=1–10, p=0–3, and x=1–5. Preferred members of this class include compounds where n=0–1, m=0–1, and x=1.

Still further examples of perfluoro vinyl ethers include perfluoro(alkoxy vinyl) ethers:

$$CF_2=CFOCF_2CF(CF_3)(CF_2O)_mC_nF_{2n+1}$$

where n=1–5, m=1–3, and where, preferably, n=1.

Specific examples of useful perfluorovinyl ethers include $CF_2=CFOCF_2OCF_2CF_2CF_3$, $CF_2=CFOCF_2CF_3$, $CF_2=CFO(CF_2)_3OCF_3$, and $CF_2=CFOCF_2CF_2OCF_3$.

The fluoroelastomers of the curable fluoroelastomer composition generally comprises from 20 to 85%, preferably 50 to 80% by moles of repeating units derived from VDF, TFE and/or CTFE, copolymerized with one or more other fluorinated ethylenically unsaturated monomer and/or one or more non fluorinated $C_2$–$C_8$ olefins, such as ethylene and propylene. The units derived from the fluorinated ethylenically unsaturated comonomer when present is generally between 5 and 45 mole %, preferably between 10 and 35 mol %. The amount of non-fluorinated comonomer when present is generally between 0 and 50 mol %, preferably between 1 and 30 mol %.

The preparation of the fluoroelastomers for use in the curable fluoroelastomer composition can be carried out by copolymerization of the monomers in aqueous emulsion according to well known methods in the art, in the presence of radicalic initiators (for instance persulphates, perphosphates, or alkaline or ammonium carbonates or percarbonates), optionally with ferrous or silver salts or of other easily oxidizable metals. Surfactants, such as for instance (per)fluoroalkylic carboxylates or sulphonates (for instance ammonium perfluorooctanoate) or (per) fluoropolyoxyalkylenic, or others known in the art, are generally also present in the reaction medium.

When the polymerization is over, the fluoroelastomer is generally isolated from the emulsion by conventional methods, such as coagulation by addition of electrolytes or by cooling. Alternatively, the polymerization reaction can be carried out in mass or in suspension, in an organic liquid wherein a suitable radicalic initiator is present, according to well known techniques. The polymerization reaction is generally carried out at temperatures comprised between 25° C. and 150° C. under a pressure of up to 10 MPa.

Suitable peroxide curatives for use in the invention are those which generate free radicals at curing temperatures. A dialkyl peroxide or a bis(dialkyl peroxide) which decomposes at a temperature above 50° C. is especially preferred. In many cases it is preferred to use a di-tertiarybutyl peroxide having a tertiary carbon atom attached to peroxy oxygen. Among the most useful peroxides of this type are 2,5-dimethyl-2,5-di(tertiarybutylperoxy)hexyne-3 and 2,5-dimethyl-2,5-di(tertiarybutylperoxy)hexane. Other peroxides can be selected from such compounds as dicumyl peroxide, dibenzoyl peroxide, tertiarybutyl perbenzoate, $\alpha,\alpha'$-bis(t-butylperoxy-diisopropylbenzene), and di[1,3-dimethyl-3-(t-butylperoxy)-butyl]carbonate. Generally, about 1–3 parts of peroxide per 100 parts of perfluoroelastomer is used.

Another material which is usually blended with the composition as a part of the curative system is a coagent composed of a polyunsaturated compound which is capable of cooperating with the peroxide to provide a useful cure. These coagents can be added in an amount equal to 0.1 and 10 parts per hundred parts fluoroelastomer, preferably between 2–5 parts per hundred parts fluoroelastomer. Because of the use of the siloxane or silazane compound in the fluoroelastomer composition, even low levels of the coagents result in excellent mechanical and physical properties and as a result improved processing of the fluoroelastomer composition can be achieved. Examples of useful coagents include triallyl cyanurate; triallyl isocyanurate; triallyl trimellitate; tri(methylallyl) isocyanurate; tris (diallylamine)-s-triazine; triallyl phosphite; N,N-diallyl acrylamide; hexaallyl phosphoramide; N,N,N',N'-tetraalkyl tetraphthalamide; N,N,N',N'-tetraallyl malonamide; trivinyl isocyanurate; 2,4,6-trivinyl methyltrisiloxane; N,N'-m-phenylenebismaleimide; diallyl-phthalate and tri(5-norbornene-2-methylene)cyanurate. Particularly useful is triallyl isocyanurate. Other useful coagents include the bis-olefins disclosed in EPA 0 661 304 A1, EPA 0 784 064 A1 and EPA 0 769 521 A1.

Additives, such as carbon black, stabilizers, plasticizers, lubricants, fillers, and processing aids typically utilized in fluoroelastomer compounding can be incorporated into the compositions of the present invention, provided they have adequate stability for the intended service conditions. In particular, low temperature performance can be enhanced by incorporation of perfluoropolyethers (cf. U.S. Pat No. 5,268, 405).

Carbon black fillers are used in elastomers as a means to balance modulus, tensile strength, elongation, hardness, abrasion resistance, conductivity, and processability of the compositions. Suitable examples include MT blacks (medium thermal black) designated N-991, N-990, N-908, and N-907, and large particle size furnace blacks. When used, 1–70 phr of large size particle black is generally sufficient.

Oxides and/or hydroxides of multivalent metals, such as Ca, Mg, Pb, Zn, Al, optionally in combination with salts of weak acids are generally added to the curable fluoroelastomer composition. Such oxides and/or hydroxides may be present in the composition in amounts of 1 to 15% by weight, preferably 2 to 10% by weight with respect to the weight of fluoroelastomer.

In addition, fluoropolymer fillers may also be present in the composition. Generally, from 1 to 50 parts per hundred parts fluoroelastomer of a fluoropolymer filler is used. The fluoropolymer filler can be finely divided, easily dispersed plastic fluoropolymer that is solid at the highest temperature utilized in fabrication and curing of the curable fluoroelastomer composition. By solid, it is meant that the fluoroplastic, if partially crystalline, will have a crystalline melting temperature above the processing temperature(s) of the fluoroelastomer(s). Examples of fluoropolymer filler are disclosed in for example EP 708797.

The curable fluoroelastomer compositions may be prepared by mixing a fluoroelastomer, a peroxide curative, a polysiloxane and other additives in conventional rubber processing equipment. Such equipment includes rubber mills, internal mixers, such as Banbury mixers, and mixing extruders.

The curable fluoroelastomer compositions are useful in production of articles such as gaskets, tubing, and seals. Such articles are produced by molding a compounded formulation of the curable composition with various additives under pressure, curing the part, and then subjecting it to a post cure cycle.

The following examples will further demonstrate the present invention. In these examples, the properties were tested as follows.

Cure Rheology Tests were run on compounded admixtures using a Monsanto Moving Die Rheometer (MDR) Model 2000 in accordance with ASTM D 5289-95 at 177° C., no preheat, 12 minute elapsed time (unless otherwise specified) and a 0.5° arc. Values were obtained for Minimum torque (ML), Maximum torque (MH), i.e., highest torque attained during specified period of time when no plateau or maximum was obtained, were measured. Also reported were: $t_s2$ (time for torque to increase 2 units above ML), t'50 (time for torque to reach ML+0.5[MH−ML]), and t'90 (time for torque to reach ML+0.9[MH−MH]). Torque is reported as Newton meters (dNm).

Press-cured samples (150×150×2.0 mm sheets, unless otherwise noted) were prepared for physical property determination by pressing at about 6.9 MegaPascals (MPA) for the indicated amount of time and temperature.

Post-cured samples were prepared by placing a press-cured sample in a circulating air oven. The oven was maintained at the indicated temperatures and the samples treated for the indicated amount of time.

Force per unit area is reported as Mega Pascals (MPa).

Physical properties were obtained according to ASTM D-412 and Hardness was obtained according to ASTM D 2240.

Compression sets were determined by ASTM D 395-89 Method B with 0.139 inch (3.5 mm) O-rings compressed for 70 hours at 200° C. Results are reported as %.

EXAMPLE 1 (COMPARATIVE)

A fluoroelastomer derived from TFE and Propylene in a weight ratio of 3.67:1 and 1.8 weight percent bromotrifluoroethylene as a bromine cure site monomer was prepared by aqueous emulsion polymerization. A curable fluoroelastomer composition was compounded therewith. The curable fluoroelastomer composition had a Mooney Viscosity ML 1+10 (121° C.) as per ASTM D-1646 of 58 and a composition as follows.

100 g of fluoroelastomer 2.5 g of Varox® DBPH-50, (50% 2,5 dimethyl 2,5 di(t-butylperoxide)hexane on a $CaCO_3$ carrier) as a peroxide initiator, 3.5 g of 72% triallyl-isocyanurate (TAIC) on a silica carrier,
3 g of Ca(OH)$_2$,
30 g of N-990 carbon black.
Results for this sample are given in table 1.

EXAMPLE 2

Example 1 was repeated with a similar composition, but with the addition of 1.4 g of 1,1,2,2 tetraisopropyl disiloxane (available from United-Chem Huls). This amount represents 11.4 m-moles of Si—H functionality per 100 g fluoroelastomer. The sample was press cured at a 160° C. for 30 minutes to reduce volatilization of the siloxane additive. Results are shown in Table 1.

EXAMPLE 3

Example 1 was repeated with a similar composition, but with the addition of 1.5 g of 1,3 Diphenyl-1,1,3,3-tetrakis (dimethylsiloxy)disiloxane, (D-6170) from United Chem (H uls). This amount represents 11.4 mmoles of Si—H functionality per 100 g fluoroelastomer. The data are shown in Table 1.

EXAMPLE 4

Example 1 was repeated with a similar composition, but with the addition of 0.68 g of a siloxane prepared by heating to 50° C. an equimolar mixture of 1,3,5,7,9 pentamethyl cyclcosiloxane and water until a single liquid phase was obtained. The amount of siloxane represents 11.4 mmoles of Si—H functionality per 100 g fluoroelastomer. The data are presented in Table 1. This sample was press cured at a 160° C. for 30 minutes to reduce volatilization of the siloxane additive.

EXAMPLE 5

Example 1 was repeated with a similar composition, but with the addition of 3.3 g of hydride terminated poly (dimethylsiloxane) (PDMS-H 580) with a number average molecular weight of 580 g/mole. This amount represents 11.4 mmoles Si—H functionality per 100 g. The data are presented in Table 1.

EXAMPLE 6

Example 1 was repeated with a similar composition, but with the addition of 0.89 g of poly(methyl-hydro siloxane) with a number average molecular weight of 390 g/mole. This amount represents 11.4 mmoles Si—H functionality per 100 g fluoroelastomer. The data are presented in Table 1. This sample was press cured at a 160° C. for 30 minutes to reduce volatilization of the siloxane additive.

EXAMPLE 7

Example 1 was repeated with a similar composition, but with the addition of 1.84 g of a copolymer of poly (dimethylsiloxane-co-methylhydrosiloxane), with a 55/45 weight percent composition and a number average molecular weight of 950 g/mole. This amount represents 11.4 mmoles Si—H functionality per 100 g fluoroelastomer. The data are presented in Table 1.

Comparing the results of Examples 2 to 7 with Example 1, it is clear that in all cases a higher torque is achieved by the addition of the siloxane compounds according to the invention. Further, higher tensile strength and moduli are observed without substantially reducing the elongation. Compression sets are reduced as well in the examples according to the invention (ex. 2–7).

EXAMPLE 8 (COMPARATIVE)

A curable fluoroelastomer composition as described in Comparative Example 1 with a Mooney viscosity of 58 (121° C. 1,19 ML) was injected molded at 190° C. The four cavity O-Ring Mold was underfilled and all O-rings had to be rejected. The filling time for the mold was 4.7 s.

EXAMPLE 9

The same composition as used in example 8 was mixed with an additional 3.3 phr (parts by weight for hundred parts by weight of fluoroelastomer) of a polysiloxane (PDMS-H 580) with an average MW of 580 g/mole and an average equivalent wt of Si—H of 11.4 mmoles/100 g. The compounded Mooney Viscosity dropped to 47. The compounded gum was injection molded under identical conditions as used in example 8. All injection shots filled the mold and resulted in excellent quality O-rings. Filling time for the mold was only 3.1 s.

TABLE 1

Cure Rheology and Physical Properties of Examples 1–7

| | EXAMPLE NUMBER | | | | | | |
|---|---|---|---|---|---|---|---|
| | 1 | 2 | 3 | 4 | 5 | 6 | 7 |
| MDR (177 C., 12') | | | | | | | |
| ML (N*m) | 0.19 | 0.18 | 0.2 | 0.23 | 0.18 | 0.21 | 0.20 |
| MH (N*m) | 1.24 | 1.40 | 1.63 | 1.39 | 1.50 | 1.34 | 1.34 |
| Delta Torque (N*m) | 1.05 | 1.22 | 1.43 | 1.16 | 1.32 | 1.13 | 1.14 |
| ts$_2$, min | 0.8 | 0.7 | 0.7 | 0.8 | 0.8 | 0.8 | 0.8 |
| t'50, min | 1.3 | 1.3 | 1.2 | 1.3 | 1.3 | 1.4 | 1.3 |
| t'90, min | 5.4 | 4.9 | 3.4 | 4.3 | 3.6 | 5.5 | 5.1 |
| tan delta | 0.12 | 0.10 | 0.11 | 0.12 | 0.11 | 0.12 | 0.12 |
| Press Cure | 177 C./10' | 160 C./30' | 177 C./10' | 160 C./30' | 177 C./10' | 160 C./30' | 177 C./10' |
| Tensile (Mpa) | 10.7 | 12.2 | 14.5 | 13.6 | 13.4 | 14.3 | 10.8 |
| Elongation (%) | 160 | 150 | 150 | 150 | 160 | 150 | 150 |
| Modulus (Mpa) | 4.8 | 5.4 | 6.6 | 5.8 | 5.5 | 5.7 | 5.5 |
| Shore "A" | 65 | 65 | 66 | 65 | 66 | 66 | 65 |
| Post Cure | 230 C./16 hr | 230 C./16 hr | 230 C./16 hr | 230 C./16 hr | 230 C./16 hr | 230 C./16 hr | 230 C./16 hr |
| Tensile (Mpa) | 12.2 | 17.0 | 18.6 | 17.1 | 16.7 | 17.7 | 16.3 |
| Elongation (%) | 130 | 140 | 140 | 140 | 140 | 140 | 150 |

TABLE 1-continued

Cure Rheology and Physical Properties of Examples 1–7

| | EXAMPLE NUMBER | | | | | | |
|---|---|---|---|---|---|---|---|
| | 1 | 2 | 3 | 4 | 5 | 6 | 7 |
| Modulus (Mpa) | 7.9 | 9.4 | 10.1 | 7.7 | 8.8 | 9.7 | 9.1 |
| Shore "A" | 71 | 71 | 70 | 71 | 69 | 71 | 71 |
| Comp Set, 200 C./70 hr | | | | | | | |
| % Set | 33 | 29 | 30 | 32 | 24 | 26 | 26 |

EXAMPLE 10 (COMPARATIVE)

A commercially available 70,3% F fluoroelastomer terpolymer, Dyneon™ FLS-2650, (available from Dyneon LLC) with 1,1-difluoro-2-bromoethylene (BDFE) as the cure site monomer, was used to prepare a peroxide curable fluoroelastomer. The curable fluoroelastomer composition had a Mooney Viscosity ML 1+10 (121° C.) as per ASTM D-1646 of 48 and comprised the following components:
100 g of fluoroelastomer
2.5 g of Varox™ DBPH-50, (50% 2,5 dimethyl 2,5 di(t-butylperoxide)hexane on a $CaCO_3$ carrier) as a peroxide initiator,
3.5 g of 72% triallyl-isocyanurate (TAIC) on a silica carrier,
3 g of $Ca(OH)_2$,
30 g of N-990 carbon black.
The results are shown in Table 2.

EXAMPLES 11 and 12

In Examples 11 and 12, a similar curable fluoroelastomer composition was prepared as described for Example 10 with the exception that in Example 11 and 12, 3.3 g of polysiloxane PDMS-H 580 were additionally added to the composition. Example 12 further differed in that the level of TAIC was reduced from 3.5 g to 2.5 g.

The results are shown in Table 2.

TABLE 2

Cure Rheology and Physical Properties of examples 10 to 12

| | Ex. 10 | Ex. 11 | Ex. 12 |
|---|---|---|---|
| MDR (177 C., 12') | | | |
| ML, N*m | 0.20 | 0.18 | 0.18 |
| MH, N*m | 1.41 | 1.58 | 1.23 |
| delta Torque, N*m | 1.21 | 1.40 | 1.05 |
| ts2, min | 0.6 | 0.7 | 0.7 |
| t'50, min | 1.0 | 1.0 | 1.0 |
| t'90, min | 3.6 | 2.0 | 2.0 |
| tan delta | 0.14 | 0.14 | 0.14 |
| Press Cure | 177 C./10' | 177 C./10' | 177 C./10' |
| Tensile (MPa) | 11.2 | 9.0 | 7.2 |
| ELongation (%) | 280 | 320 | 370 |
| Modulus (MPa) | 4.5 | 3.7 | 2.6 |
| Duro, Shore "A" | 73 | 74 | 70 |
| Post Cure | 230 C./16 hr | 230 C./16 hr | 230 C./16 hr |
| Tensile (MPa) | 14.0 | 13.8 | 13.9 |
| Elongation (%) | 230 | 250 | 290 |
| Modulus (MPa) | 4.7 | 5.0 | 4.1 |
| Duro, Shore "A" | 76 | 76 | 73 |

What is claimed is:

1. A curable fluoroelastomer composition comprising:
   (a) a fluoroelastomer comprising a cure site component having a halogen capable of participation in a peroxide cure reaction;
   (b) an organic peroxide;
   (c) a siloxane or silazane comprising one or more -SiH groups.

2. A curable fluoroelastomer composition further comprising a coagent comprising a polyunsaturated compound capable of participating in said peroxide cure reaction.

3. A curable fluoroelastomer composition according to claim 2 wherein said coagent is selected from the group consisting of triallyl-cyanurate, triallyl-isocyanurate, triallyl trimellitate, tri(methylallyl)isocyanurate, tris(diallylamino)-s-triazine, triallyl-phosphite, N,N-diallylacrylamide, hexaallyl-phosphoramide, N,N,N'N'-tetraalkyl tetraphthalamide; N,N,N'N'-tetraallyl malonamide; trivinyl isocyanurate; 2,4,6-trivinyl methyltrisiloxane; N,N'-m-phenylenebismaleimide, diallyl-phthalate and tri(5-norbornene-2-methylene)-cyanurate.

4. A curable fluoroelastomer composition according to claim 1 or 2 wherein said siloxane corresponds to the formula:

wherein each $R^a$ independently represents an alkyl group or an aryl group each of which is optionally substituted, each $R^b$ independently represents an alkyl group which substituted, t and w represent an integer of at least 1 and the sum of s+t+w is 4.

5. A curable fluoroelastomer composition according to claim 1 wherein said siloxane is a polysiloxane corresponding to the formula:

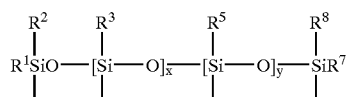

wherein $R^1$, $R^2$, $R^3$, $R^6$, $R^7$, $R^8$ and $R^9$ each independently represents hydrogen, an alkoxy group, an alkyl group which is optionally substituted or aryl group which is optionally substituted, $R^4$ and $R^5$ each independently represents an alkoxy group, an alkyl which is optionally substituted or aryl group which is optionally substituted, x represents a value of 0 to 150, y represents a value of 0 to 150 and with the proviso that when x=0, at least one of $R^1$, $R^2$, $R^6$, $R^7$, $R^8$ and $R^9$ represents a hydrogen atom.

6. A curable fluoroelastomer composition according to claim 1 wherein said siloxane is a cyclic siloxane corresponding to the formula:

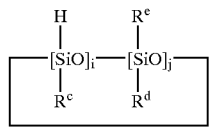

wherein $R^c$ represents hydrogen, an alkyl group which is optionally substituted or an aryl group which is optionally substituted, $R^d$ and $R^e$ each independently represents an alkyl which is optionally substituted or aryl group which is optionally substituted, i is at least 1 and the sum of i+j is at least 3.

7. A curable fluoroelastomer composition according to claim 1 wherein said siloxane is a disiloxane or a cyclic polysiloxane.

8. A curable fluoroelastomer composition according to claim 1 wherein said halogen is selected from bromine and iodine.

9. A curable fluoroelastomer composition according to claim 1 wherein said fluoroelastomer is a copolymer selected from the group consisting of copolymers of vinylidene fluoride and hexafluoropropylene, copolymers of vinylidene fluoride, hexafluoropropylene and tetrafluoroethylene, copolymers of tetrafluoroethylene and propylene, copolymers of tetrafluoroethylene, propylene and vinylidene fluoride, copolymers of tetrafluoroethylene, propylene and ethylene and copolymers of tetrafluoroethylene and a perfluorinated vinyl ether.

10. A curable fluoroelastomer composition according to claim 1 wherein said composition comprises for 100 parts by weight of said fluoroelastomer, between 0.1 parts by weight and 10 parts by weight of said organic peroxide and between 0.1 parts by weight and 10 parts by weight of said polysiloxane.

11. A curable fluoroelastomer composition according to claim 10 wherein said curable fluoroelastomer composition further comprises between 0.1 parts by weight and 10 parts by weight of a coagent comprising a polyunsaturated compound capable of participating in said peroxide cure reaction.

12. Method for making a shaped fluoroelastomer article comprising curing a composition as defined in any of claims 1 to 2 in a desired shape.

13. Shaped fluoroelastomeric article obtainable by curing a composition as defined in claims 1 or 2.

14. A curable fluoroelastomer composition according to claim 1 wherein the siloxane or silazane comprises one or more —QSiH groups in which Q represents O or N.

* * * * *

UNITED STATES PATENT AND TRADEMARK OFFICE
CERTIFICATE OF CORRECTION

PATENT NO.   : 6,613,846 B2
DATED        : September 2, 2003
INVENTOR(S)  : Hintzer, Klaus It is certified that error appears in the above-identified patent and that said Letters Patent is hereby corrected as shown below:

Column 12,
Line 25, "tris(diallylamino)-" should be shown as -- tris(diallylamine)- --
Line 41, after the word "which" insert -- is optionally --

Column 14,
Line 17, delete "any of"
Line 18, "1 to 2" should be shown as -- 1 or 2 --

Signed and Sealed this

Twenty-third Day of March, 2004

JON W. DUDAS
*Acting Director of the United States Patent and Trademark Office*